Aug. 8, 1967

J. R. McCLOUD 3,335,245

COMBINED TANK LINER INTERPHASE BARRIER
FOR OIL CIRCUIT BREAKERS

Original Filed Nov. 3, 1960

INVENTOR.
JAMES R. McCLOUD

BY
OSTROLENK, FABER, GERB & SOFFEN

ATTORNEYS

Aug. 8, 1967 J. R. McCLOUD 3,335,245
COMBINED TANK LINER INTERPHASE BARRIER
FOR OIL CIRCUIT BREAKERS
Original Filed Nov. 3, 1960 9 Sheets—Sheet 5

INVENTOR.
JAMES R. McCLOUD
BY
OSTROLENK, FABER, GERB & SOFFEN
ATTORNEYS

INVENTOR.
JAMES R. McCLOUD
BY
OSTROLENK, FABER, GERB & SOFFEN
ATTORNEYS 3,335,245
COMBINED TANK LINER INTERPHASE BARRIER FOR OIL CIRCUIT BREAKERS

James R. McCloud, Burbank, Calif., assignor to I-T-E Circuit Breaker Company, Philadelphia, Pa., a corporation of Pennsylvania
Application Sept. 4, 1964, Ser. No. 396,796, which is a division of application Ser. No. 67,125, Nov. 3, 1960. Divided and this application Jan. 12, 1966, Ser. No. 529,904
1 Claim. (Cl. 200—150)

This invention relates to oil circuit breakers, and more specifically relates to a three-phase oil circuit breaker which is enclosed in a single tank. This application is a division of copending application Ser. No. 396,796, filed Sept. 4, 1964, now abandoned and which was, in turn, a divisional application of application Ser. No. 67,125, filed Nov. 3, 1960, now abandoned.

Oil circuit breakers of the type to which my invention is directed, and for illustrative purposes may be rated at 34.5 kilovolts at 1500 million volt amperes, normally have a single phase contained in a respective oil tank whereby the contacts are separated in oil for permitting effective arc interruption.

In the present invention, a multiphase circuit breaker unit has each of the phases contained in a common tank, this being made possible by the combination of many novel features in the construction of the various constituent elements of the circuit breaker.

In accordance with one feature of the invention, I provide an exhaust vent means in the upper dome of the tank which serves the purpose of the well-known breather pipes of the prior art. In the past, however, these vents have had an internal baffle structure for preventing the entrance of foreign matter from areas external to the tank, such as oil spray and the like. I have improved this baffle construction, and form the breather pipe to have two filters of a filter bronze at either end to condense vapor oil and keep oil from escaping and to relieve gas pressure, and further form the pipe to have a re-entrant bend which prevents the entrance of rain or high pressure water used in washing down the equipment into the tank.

As a further feature of the invention and since the operating linkage is contained external of the tank structure, it is necessary to introduce some type of link through the tank wall in order to transmit motion from the operating mechanism to the internally positioned contact operating linkage. It is necessary that the entrance of this rod will not permit an opening through which oil or gas within the tank can escape into the operating mechanism housing, particularly during interrupting conditions.

Accordingly, I have provided a novel seal which effectively seals the interior of the tank from the interior of the operating mechanism housing, even though the rod which must interconnect these two has both an axial motion and a lateral motion. This seal is more specifically formed of a plurality of plates or thin sheets having a very close clearance around the interconnecting rod. These thin sheets are then contained within two adjacent plates which are relatively fixed, and have relatively large apertures therein for passing the connecting rod.

The two plates are further arranged to compress the thin sheets into relatively light mechanical engagement with respect to one another whereby the sheets are capable of having lateral motion with respect to the containing plates and with respect to one another, while still providing an effective seal between their internal diameter and the external diameter of the connecting rod carrying the sheets. Accordingly, an effective seal is formed, even though the connecting rod has both axial and lateral motion with respect to the two plate members which are stationarily positioned and carry the sheets.

Alternative to the use of flat disks, the seal may be formed of a single disk of flexible material such as neoprene which is biased toward a sealing disk by a biasing means which will not be defeated by low pressure conditions in the tank.

In order to prevent a line to ground fault by an expanding gas bubble from an interrupter hitting the side of the tank, it has been the practice to place an insulating liner on the inner surface of the tank wall. There is the additional danger of a line to line fault when an expanding gas bubble connects two interrupters in the tank, and it has been the practice to provide insulating barriers between phases to prevent this condition. In accordance with the present invention, a unitary structure is provided for achieving both tank wall insulation and a phase to phase barrier. Thus, a single insulating strip will lie adjacent a first circumferential portion of the tank, and its ends are then directed toward the center of the tank to form an insulated chamber for one phase of the interrupters. A second insulating strip, formed in the same manner, forms an insulated chamber for another phase of the interrupters, and one of its ends is connected to an adjacent end of the first insulating strip. A third insulating strip forms a third chamber for the third phase, and its two ends communicate with the free ends of the first two insulating strips whereby each of the phases is insulated from one another and the interior of the tank wall is lined.

A novel manner is also provided for securing the cross bar which carries the movable bayonet type contacts to the lift rod which carries the cross bar. Generally, the lift rod is made of wood, and it is provided with notches on either side which receive parallel connected and adjacently disposed metallic cross bars.

Considerable trouble has been experienced in the past since the notch in the wood is subject to fracture along the grain of the wood and additionally requires relatively precise machining so that the dimension of the notch exactly receives the cross bar dimension.

I have found that I can eliminate these problems by merely keying the cross bars with respect to the lift rod so that additional support corners are provided in the wood by providing a plurality of keys, and the requirement for an extremely accurately dimensioned notch in the wood is eliminated.

The concept of keying can be carried further to the securing of the metallic block member connected to the cross bars where the metallic block member carries the bayonet type contact. That is to say, in the past, the metallic block member which receives the movable contact has had a single notch cut in the opposing sides thereof which receive the cross bar members in the same manner that the cross bar members were received by the wooden lift rod.

In accordance with the present invention, however, the relatively complex machining of the metallic block member is avoided through the use of a plurality of keying members which communicate between the cross bars and the block.

The necessity for adjustably mounting the interrupter chamber has been set forth above where the interrupter chamber is adjustably mounted so that it can be positioned in a lateral plane by means of the eccentric ball connection. I have also found that the movable contact itself may be adjustably secured to the mounting block which carries the movable contact so that additional adjustment of the movable contact position may be achieved.

More specifically, the mounting block is modified to threadably receive a cylindrical mounting member in the form of a split ring. The split ring has an off-center threaded opening to receive the movable bayonet type contact whereby rotation of the ring will move the contact in an eccentrical manner to achieve further adjustment in a lateral plane.

Once the appropriate position is reached and the securing bolts which fasten the cross bars to the mounting block are tightened, the split ring will contract to firmly mechanically and electrically secure the bayonet contact split ring block and cross bar to a unitary type of member.

As previously stated, it has always been the practice to fabricate the lift rods of an elongated wooden block having a square cross-sectional area. I have found that the lift rod can be formed of a Fiberglas rod which is superior to the previously used wooden rod.

One of the problems heretofore in using a Fiberglas rod was in the difficulty of connecting the rod to the steel output linkages of the operating mechanism and in guiding the motion of a circular rod.

In accordance with the present invention, a steel link is connected to the end of the Fiberglas rod by using a Fiberglas hollow tube which terminates in an outwardly flared internal taper of 2° with respect to the axis of the tube. The connecting steel link has a cooperating inwardly directed taper, and the two tapered surfaces are joined by gluing with an epoxy type of glue. By using this 2° taper, it has been found that a superior joint is formed with respect to a joint with no taper or with a relatively sharp taper.

In order to guide the round Fiberglas tube on the support, an annular guide member which may be of Bakelite is supported with respect to the tube as by supporting the Bakelite guide ring within a Fiberglas tube which is outwardly concentric with the Fiberglas rod and is secured by any fixed structure such as the lift frame mechanism.

The end of the Fiberglas tube is connected to the cross bars as by securing the tube to an aluminum block through the use of a wire ring on the outer surfaces of the Fiberglas tube which cooperates with an inner annular cut in the block, and the aluminum block is then secured to the cross bars as by the keying method described above which positions the cross bars with respect to the block.

Accordingly, the primary object of this invention is to provide a novel multiphase oil circuit breaker which may be enclosed in a single tank.

Another object of this invention is to provide a single tank construction for a multiphase oil circuit breaker having a rating of the order of 34.5 kilovolts.

Another object of this invention is to form a single tank structure for a multiphase circuit interrupter wherein a removable upper dome section completely mounts the multiphase circuit breaker.

Another object of this invention is to provide a novel breather pipe for oil tanks which are to receive circuit breakers which includes at least one bronze filter member, and has a re-entrant portion for preventing the entrance of external foreign matter.

Another object of this invention is to provide a novel mounting means for an interrupter structure which is to be mounted to a terminal bushing within an oil tank wherein the interrupter structure is adjustably mounted in a vertical and lateral direction.

A still further object of this invention is to provide a novel unitary barrier means for lining the interior of the tank and forming a barrier between phases to prevent line to ground faults and line to line faults.

A still further object of this invention is to provide a novel unitary barrier means for lining the interior of the tank and forming a barrier between phases to prevent line to ground faults and line to line faults.

Another object of this invention is to provide a novel means for securing the cross bars to the lift rod.

Another object of this invention is to provide a novel manner for securing cross bars to a wooden lift rod through the use of a keying structure which eliminates the need for an enlarged notch in the wooden cross bar.

A further object of this invention is to provide novel means for securing the contact block carrying a bayonet type contact to the cross bars.

Yet another object of this invention is to provide a keying type of structure for mounting the contact carrying block to the cross bars.

A further object of this invention is to provide a novel eccentric type of adjustable connection between the movable contact and the cross bars to permit lateral adjustment of the movable contact with respect to the cross bars.

A further object of this invention is to provide a novel lift rod construction which includes a Fiberglas tube.

Yet another object of this invention is to provide a novel manner for connecting a hollow Fiberglas tube to a solid steel member.

Another object of this invention is to glue a hollow Fiberglas tube to a steel rod by forming a 2° tapered joint with respect to the axis of the rod.

Another object of this invention is to provide a novel guide means for guiding a round Fiberglas lift rod which includes an annular guide supported within a supporting tube which is concentric with respect to the rod.

Another object of this invention is to provide a novel gas seal between a circuit breaker oil tank and an operating mechanism whereby a link extending between the two may have axial, angular, and lateral motion without defeating the seal.

A further object of this invention is to provide a novel gas seal between two containers which have a common member extending therebetween which includes a plurality of thin plates enclosing the common member and movable between the two stationary enclosing supports.

These and other objects of this invention will become apparent from the following description when taken in connection with the drawings, in which.

General arrangement

Figure 1:
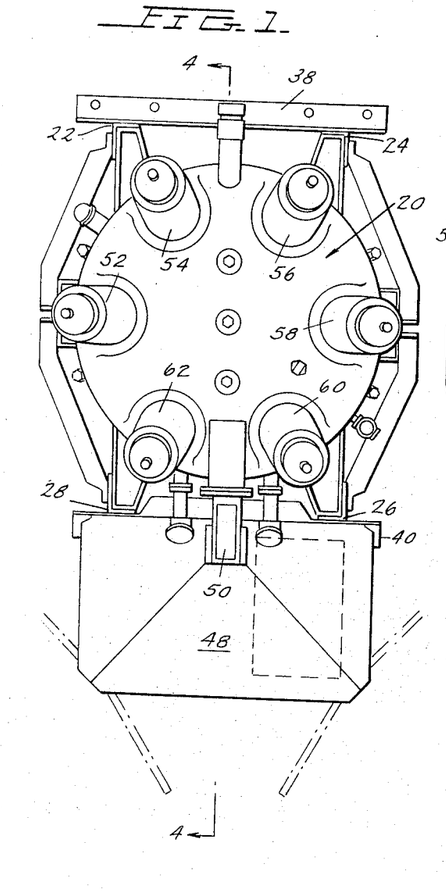
FIGURE 1 shows a top plan view of my novel multiphase oil circuit breaker which is contained in a single tank.
Figure 2:
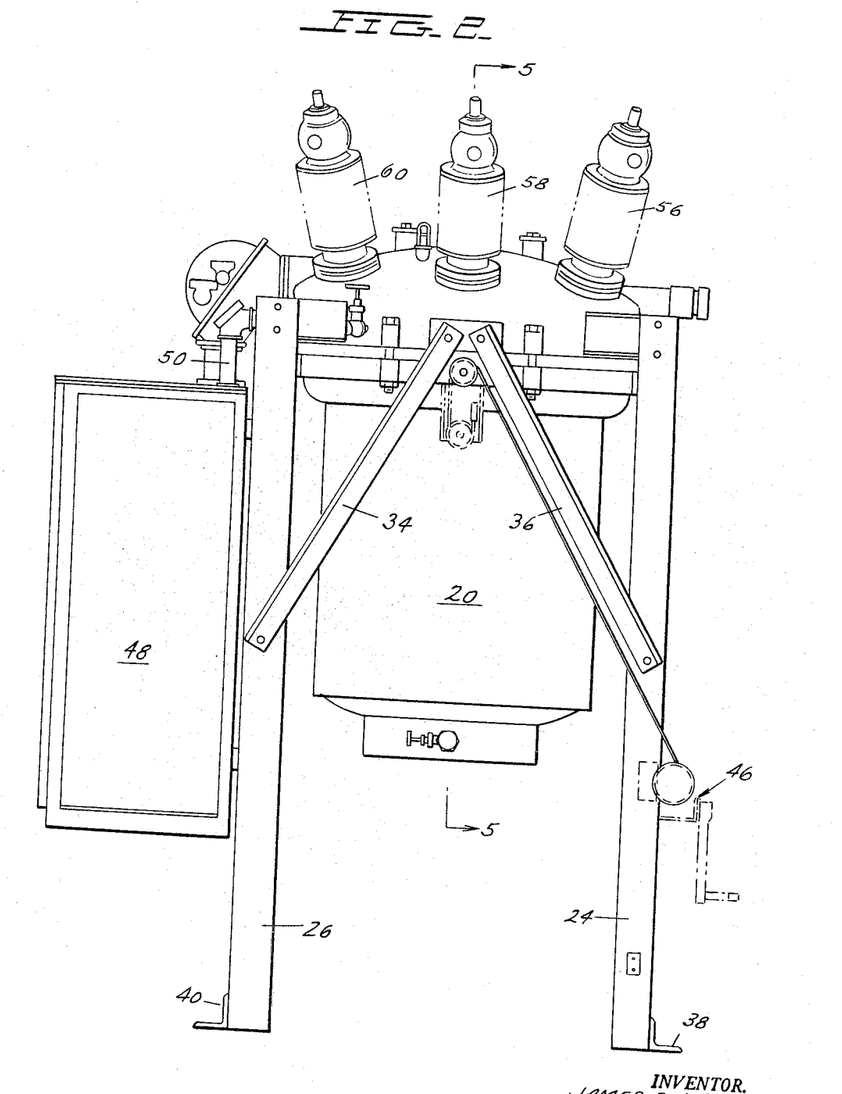
FIGURE 2 is a side plan view of FIGURE 1.
Figure 3:
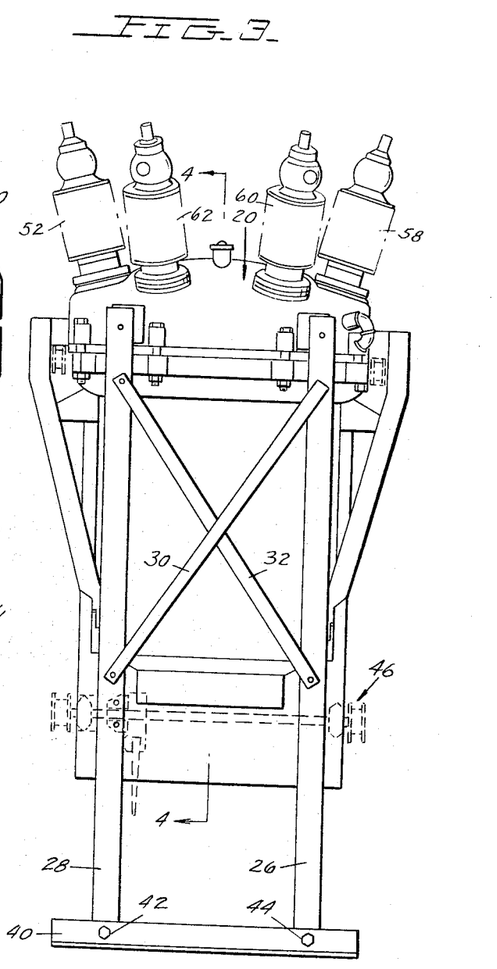
FIGURE 3 is a front plan view of FIGURE 1.

The general arrangement of the circuit breaker exterior including its support is shown in FIGURES 1, 2 and 3.

Referring now to FIGURES 1, 2 and 3, the assembled circuit breaker and tank 20 is supported by four legs 22, 24, 26 and 28 which are formed of elongated angles. Legs 22, 24, 26 and 28 are braced to prevent movement with respect to one another by bracing members, such as braces 30 and 32 of FIGURE 3, and braces 34 and 36 of FIGURE 2. The legs are then secured to base angles 38 and 40 by anchor bolts or the like which extend through the base angles, as is shown in FIGURE 3 for the case of bolts 42 and 44.

A geared tank lifter 46 is provided, as seen in FIGURE 2, for raising or lowering oil tank 20 with respect to legs 22 through 28 in the usual manner.

An operating mechanism housing 48 is positioned externally of the circuit breaker tank 20 and is also carried by legs 26 and 28 in any desired manner. The mechanism internal of housing 48 may be of any standard type and will not be described in detail in the present application. It is sufficient for purposes of the present invention to understand that the mechanism housing 48 will contain an operating mechanism which will cause the motion of internal linkages to be transmitted to the operating linkage to be described more fully hereinafter in connection with FIGURE 4, and also that the operating mechanism may be energized automatically responsive to signals derived from current transformers contained within tank 20 and brought into the operating mechanism through conduit pipes 50.

As best seen in FIGURE 1, a plurality of terminal bushings 52, 54, 56, 58, 60 and 62 respectively are carried by the upper portion of tank 20 in a manner to be described more fully hereinafter. These bushings are circumferentially arranged with respect to the top of tank 20, and are arranged on the surface of a cone, which cone converges inwardly toward the bottom of tank 20.

The manner in which these terminal bushings are mounted with respect to tank 20 whereby the complete circuit interrupter is mounted to a removable portion of the tank 20 will be seen more fully hereinafter.

Tank structure

Figure 4:
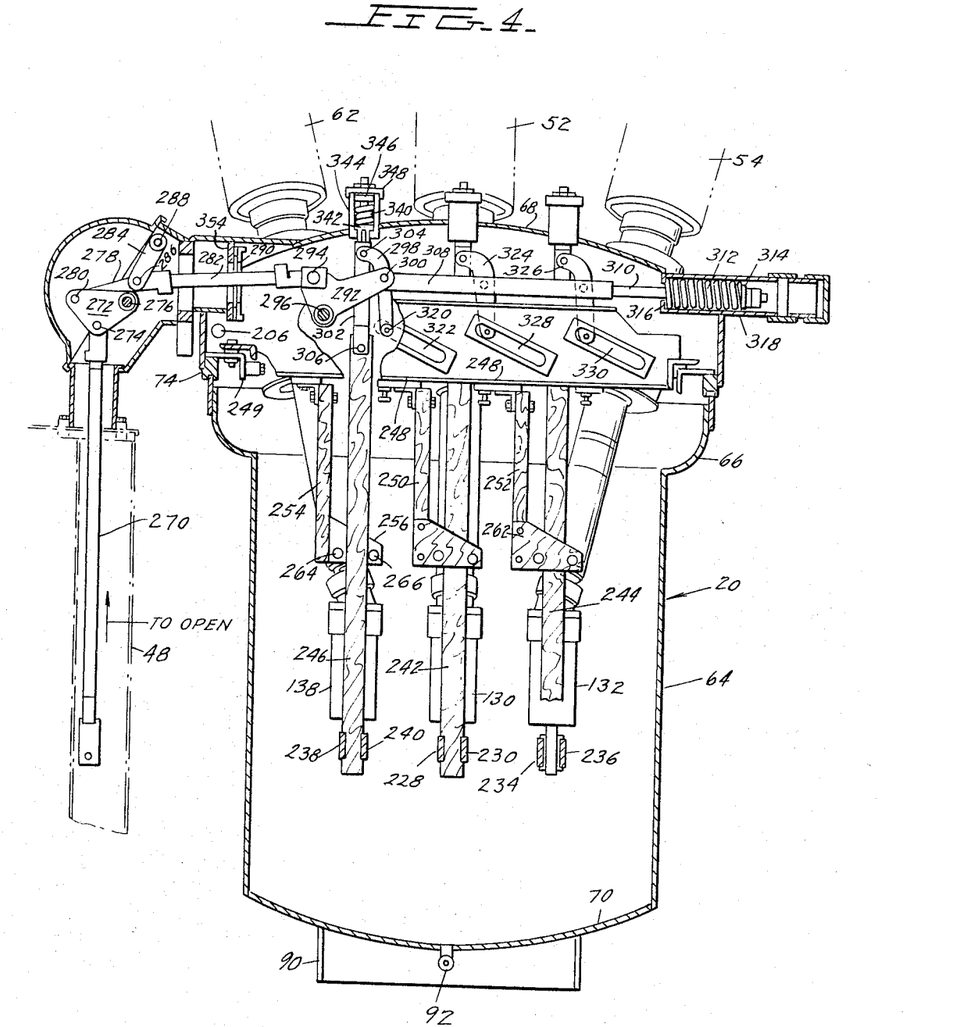
FIGURE 4 is a side cross-sectional view of the tank of FIGURE 1 when taken across the lines 4—4 in FIGURE 1, and lines 4—4 in FIGURE 3.
Figure 5:
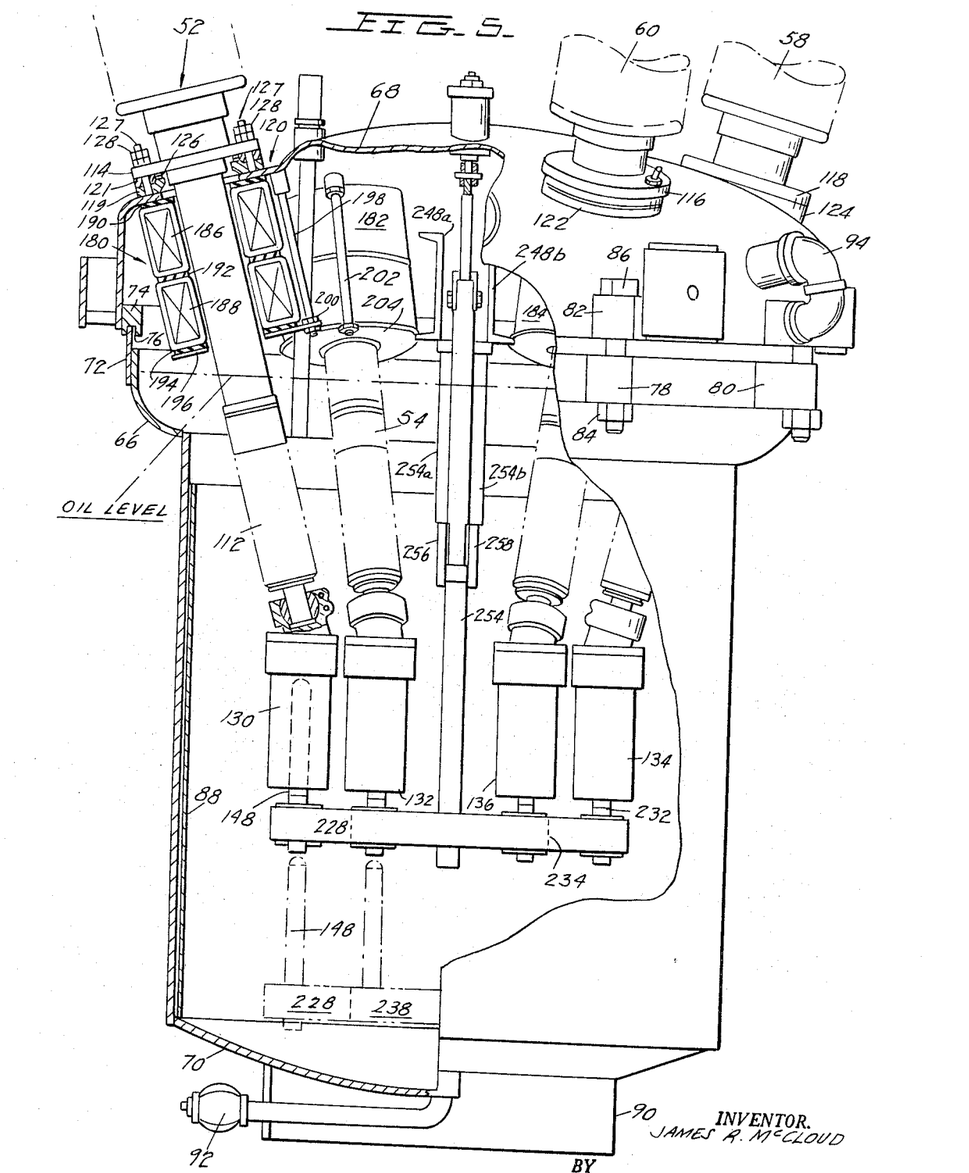
FIGURE 5 is a side view of the tank of FIGURE 3 with a portion of the tank wall removed and with two interrupters removed.

The general tank arrangement of tank 20 is best understood by reference to FIGURES 4 and 5. In the figures, it will be seen that the tank has an enlarged upper head portion. More specifically, the tank is formed of a lower cylindrical portion 64 and an upper dome portion formed of hemispherically-shaped casings 66 and 68. If desired, hemispherical casings 66 and 68 may be of identical cross-section, although in the embodiment presented herein, casing 68 has a larger diameter than does casing 66. The central portion of lower casing 66 is cut-out, and the cut-out portion may be used as the bottom wall 70 of the tank. Thus, a substantial economy of tank construction may be effected.

Figures 6, 7, 8, 9, 10:
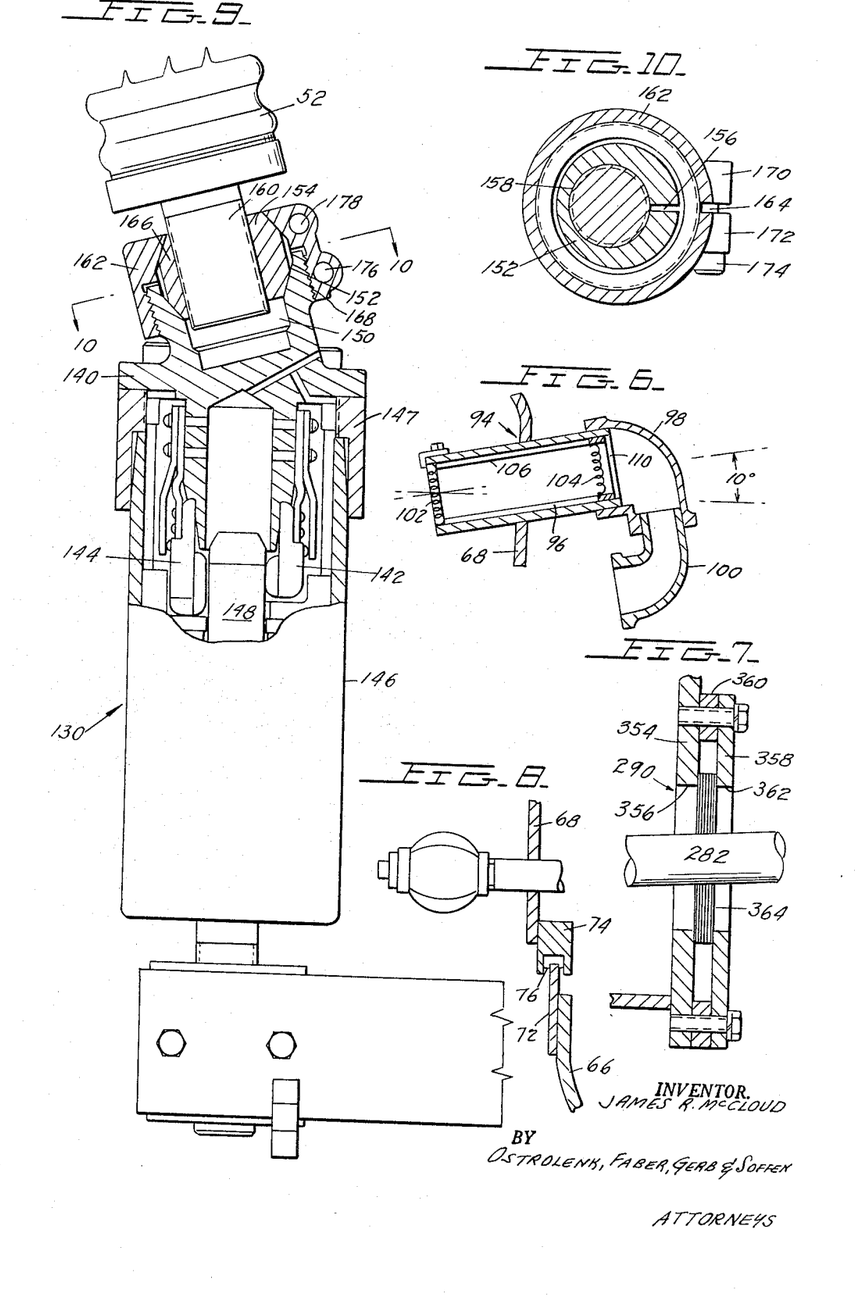
FIGURE 6 is a side cross-sectional view of the exhaust structure in the upper tank portions of FIGURES 4 and 5.
FIGURE 7 is a side cross-sectional view of the gas seal formed between the tank housing and operating mechanism housing of FIGURE 4.
FIGURE 8 is a detailed cross-sectional view which illustrates the manner in which the upper dome portion of the tank is connected to the lower dome portion of the tank.
FIGURE 9 is a partially cross-sectional view of one of the interrupting chambers of FIGURES 4 or 5, and particularly illustrates the novel eccentric ball connection between the interrupter chamber and the bushing associated therewith.
FIGURE 10 is a cross-sectional view of the eccentric ball connection of FIGURE 9 taken across lines 10—10 in FIGURE 9.

The two hemispherical sections 66 and 68 are joined in a manner best shown in FIGURES 5 and 8 by securing a ring 72 to lower hemisphere 66 as by welding and by securing a notched ring 74 to upper hemisphere 68. Ring 74 has a notch 76 therein which carries a suitable gasket material, such as cork or any other desired material filler, and receives the upper end of ring 72.

A plurality of mounting blocks, such as blocks 78 and 80 of hemisphere 66 shown in FIGURE 5, and block 82 of hemisphere 68 may then be bolted together by cooperating nuts and bolts, such as nut 84 and bolt 86, whereby the upper portion of ring 76 of FIGURES 5 and 8 will be driven deeply into the filler within groove 76 of ring 74. Accordingly, the upper and lower hemispheres 68 and 66 respectively will be firmly connected with respect to one another in a substantally gas tight manner.

The consequences of providing an enlarged head or enlarged upper portion for the tank will be described more fully hereinafter as permitting the entrance of a plurality of bushings having current transformers associated therewith, so that a multiphase interrupter can be associated with the single tank 20, while, at the same time, only a small oil volume is necessary.

In each of FIGURES 4 and 5, it will be understood that the tank is to be filled with oil which will act as an arc quenching material for the arc interrupters to be immersed in the tank. The oil level within the tank is best shown in FIGURE 5 by the dot-dash line labeled "oil level," and it will be seen that the major portion volume is contained within lower cylindrical portion 64 of the tank which defines a relatively small volume.

As best seen in FIGURE 5, the oil tank portion 64 further has a tank liner 88 of insulating material which prevents gases expelled from the arc quenchers or interrupters contained within the tank from establishing a current carrying path to the tank wall, and, thus, cause a short circuit to ground.

The bottom wall 70 of tank 20 has an extending cylindrical casing 90 welded thereto to serve as a seat for the tank, and also protects the drain valve 92 from damage.

The upper hemisphere 68 of tank 20, as shown in FIGURE 5, has an exhaust structure or breather pipe 94 associated therewith which communicates between the air above the oil level within the circuit breaker tank and the external atmosphere. The main purpose of breather pipe 94 is to vent gases generated during arc extinction. It is, however, imporant that no foreign matter be brought from the external atmosphere into the tank, such as rain or water from high pressure cleaning hoses, and in a like manner, it is important that oil from the tank is not vented through breather pipe 94.

Accordingly, I construct the breather pipe of a conduit 96 which has a first elbow 98 secured thereto as by welding. A second elbow 100 is then connected to elbow 98 so as to form a re-entrant member.

A first and second bronze fiber filter 102 and 104 respectively are then positioned within conduit 96, and are spaced from one another by a tubular spacer 106. Clips, such as clip 108, and a ring, such as ring 110, then hold all of the parts in position with respect to one another.

The pipe elbows 98 and 100 will direct the gas flow during arc interruption back toward casing 20, rather than outwardly and toward operating personnel. At the same time, the re-entrant shape of the breather pipe will prevent rain from entering the breaker, while the added return bend created by elbow 100 aids in preventing high pressure water used in washing down the equipment from entering the breaker.

Mounting of circuit breaker equipment with respect to the bar

As previously described in FIGURES 1, 2 and 3, bushings 52 through 62 are carried with respect to tank 20. The manner in which these bushings are connected to the tank is best shown in FIGURES 4 and 5 which show the circuit breaker being carried from removable dome section 68.

Referring particularly to FIGURE 5, particularly to the mounting of bushing 52, the upper dome 68 is "bumped" to provide a flattened portion which is then provided with an enlarged aperture for receiving the lower extending portion 112 of bushing 52. In a like manner, dome 68 has openings in other "bumped" portions for each of the other extending bushing portions for bushings 54 through 64. By flattening these portions of the tank, inserts are not needed to compensate for the dome curvature. Each of the bushings is provided with a flange collar, such as flange 114 for bushing 52, and similar flanges 116 and 118 for bushings 60 and 58, respectively, of FIGURE 5.

The lower portion of the flanges, such as flange 114, is seated upon a ball joint flange, such as ball joint flange 120 for bushing 52 which includes members 119 and 121 which are seated on at least three studs 127 (only two of which are shown) welded to the flattened portions of top head 68. Members 119 and 121 engage one another along an annular conical surface so that member 121 can be skewed as desired, and the position of member 121 and thus flange 114 will be fixed in any desired position by tightening bolts 128 of studs 127. A gasket such as gasket 126 then seals the connection so it will be gas tight. Similar ball joint flanges 122 and 124 are provided for bushings 60 and 58 respectively.

In a like manner, each of bushings 54 through 62 will be directly secured to top head 68 as by ball joint members 122 and 124 for bushings 60 and 58 respectively. Accordingly, the bushings are directly carried by the top head 68 and can be lifted as a unit with respect to the main body of the tank.

Interrupter structure and mounting of the interrupter structure

Each of bushings 52 through 62 of the figures are terminated with an interrupter which essentially comprises a housing containing a relatively stationary contact element which is adapted to receive a relatively movable contact whereby a cross blast of oil will be passed through the contacts when they are moved to their disengaged position to help in extinguishing an arc drawn thereby.

Typical interrupter structures which may be used in the structure described herein are set forth in copending applications Ser. Nos. 2,390 and 2,530, respectively.

The interrupter structures for each bushing are shown in FIGURES 4 and 5 as interrupters 130, 132, 134, 136 and 138 for bushings 52, 54, 56, 58 and 62, respectively. A similar interrupter structure is provided for bushing 60 which is not shown in FIGURES 4 and 5 for purposes of clarity.

Interrupter structure 130 which is typical of all of the interrupters of the unit is shown in an enlarged partial cross-sectional view of FIGURE 9. Referring to FIGURE 9, the interrupter or arc quencher 130 is comprised of a conductive contact support member 140 which is electrically connected to a plurality of circumferentially arranged stationary contact fingers, such as contact finger 142, and one elongated arcing contact finger 144. The manner in which these contact fingers are connected to contact support 140 is described in detail in either of the above noted copending applications, Ser. No. 2,390 or Ser. No. 2,530.

A housing or container 146 which may be of Fiberglas is then connected to contact support 140 through a casting member 147, and carried a plurality of baffles and arc splitters in the manner shown in the above noted copending applications which communicate with vents (not shown) in chamber 146. The arc splitters and baffles within chamber 146 have an axial opening therein which receives a bayonet-type movable contact 148 in FIGURE 9 for interrupter 130. In a like manner, all of the other arc interrupters associated with the other bushings of FIGURES 4 and 5 have a similar bayonet-type movable contact entering therein and cooperating with the tulip-type cluster of stationary contacts connected to their respective contact support. Thus, when the movable contacts, such as contact 148 which is shown in the engaged position in FIGURES 4, 5 and 9, are withdrawn downwardly to a disengaged position, an arc will be drawn between arcing contact 144 and 148 so as to generate a relatively high pressure due to dissociated oil which, in turn, will drive oil between the disengaging contacts and outwardly of the vents in chamber 146 to extinguish the arc.

Each of the interrupters are mounted to their respective bushings in a novel manner which permits vertical, lateral and plumb adjustment of the interrupters. This feature is necessary since proper clearance and alignment must be kept between the various interrupter structures, and between each of the interrupters and their respective bayonet-type movable contact.

The manner in which the electrical and mechanical connection is made between the bushing studs and the interrupters is best illustrated in FIGURES 9 and 10 for the case of interrupter 130 and bushing 52, and is comprised of an eccentric-type ball socket arrangement. The contact support 140 is provided with a central opening 150 having a tapered surface 152 at the top thereof. An eccentric ball 154 of conductive material has a lower surface which may be tapered at an angle which cooperates with taper 152, as shown, or may be of a partially spherical external surface which will engage surface 152.

The internal diameter of ball 154 is threaded by threads 158 which cooperate with an external thread on bushing stud 160 of bushing 52 so that the ball 154 may be threaded on bushing stud 160. A split lock ring 162 of conductive material which is split by virtue of slot 164 (FIGURE 10) has an upper internal taper 166 which falls on the upper surface of ball 154 which may be either plane or circular, as is the case for the lower surface of the ball, and the lock ring 162 further has a lower internal thread 168 which cooperates with an external thread on contact support 140.

The split lock ring 162 is then provided with a clamping means which comprises, as best seen in FIGURE 10, a first and second lug 170 and 172 respectively wherein a bolt 174 passes through a clearance opening 176 (FIGURE 9) in lug 172 and then into a cooperating internal thread in lug 170. Accordingly, by tightening screw 174 into lug 170, the split lock ring 162 will be contracted. A similar upper screw clamp means which includes clearance opening 178 in the upper lug of FIGURE 9 is also provided whereby the split lock ring is clamped by the two screw members.

In operation, this structure will permit both vertical, lateral and plumb adjustment of interrupter structure 130 with respect to bushing 52. More specifically, when assembling the joint the split lock ring 162 is laid on top of eccentric ball 154, and the eccentric ball 154 is then threaded on to bushing stud 160. Locking ring 162 is then rotated independently of eccentric ball 154 onto the external threads of contact support 140 until the interrupter 130 assumes an appropriate vertical position.

Lateral adjustment of interrupter 130 is achieved by appropriately angularly positioning ball 154 with respect to stud 160, whereby rotation of eccentric ball 154 will cause a lateral motion of interrupter 130 with respect to bushing 52.

Finally, the correct plumb of interrupter 130 is achieved by appropriately angularly positioning interrupter 130 by causing the tapered surfaces 152 of contact support 140 and tapered surface 166 of lock ring 162 to rotate with respect to eccentric ball 154.

Once the appropriate position is assumed, the lock screws, such as lock screw 174, are firmly tightened to cause a contraction of lock ring 162 and a like contraction of split eccentric ball 154 whereby the threads joining ball 154 and bushing stud 160 are firmly connected, and the threads joining locking ring 162 to contact support 140 are also firmly tight. Accordingly, a rigid mechanical connection is formed between bushing 52 and interrupter 130, and at the same time, a low resistance electrical connection is formed from stud 160 onto contact support 140.

*Mounting of current transformers*

As previously indicated, each of bushings 52 through 62 have current transformers associated therewith which may be used to initiate operation of the operating mechanism responsive to predetermined current conditions in any of the phases. These current transformers may be internally mounted of the tank by virtue of the enlarged dome section, and are shown in FIGURE 5 as comprising current transformers 180, 182 and 184 for bushings 52, 54 and 56, respectively. In a like manner, bushings 58, 60 and 62 will have similar current transformers associated therewith.

The current transformers are constructed in the standard manner, and include two magnetic cores 186 and 188 for the case of current transformer 180, which each have a secondary winding associated therewith. The central bushing conductor serves as the primary winding for the current transformers.

In mounting current transformer 180, a first insulating spacer 190 is placed between the upper surface of the winding of core 186 and the upper tank surface, while a second insulating spacer 192 is connected between the two transformer elements, and a third insulating spacer 194 is placed between the lower transformer 188 and a bottom support plate 196. The bottom support plate has openings therein for receiving a connecting rod, such as rod 198, which is connected to the top of the tank and is fastened to the lower plate 196 by bolts, such as bolt means 200.

Each of the other current transformers are mounted in the same manner above described for current transformer 180. Thus, for example, current transformer 182 is mounted by means of rod 202 which has one end connected to the tank top and a lower end connected to lower plate 204.

Figures 11, 14:
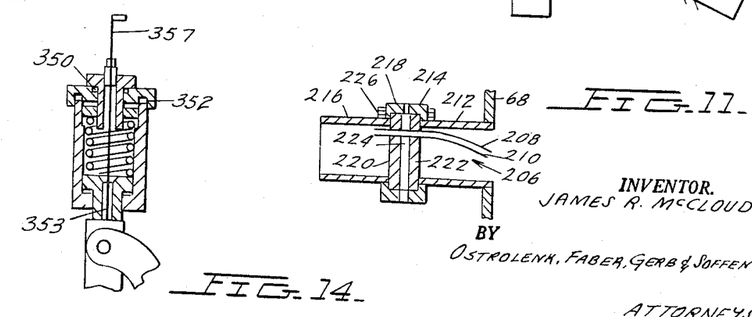
FIGURE 11 is a detailed side cross-sectional view which illustrates the manner in which the current transformer leads are taken through the tank wall in a substantially gas tight manner.
FIGURE 14 shows an enlarged cross-sectional view of the damping spring of FIGURE 4 for limiting over-travel of the movable contact.

It is now necessary to bring out the leads from the current transformer secondary windings to the operating mechanism through conduit 50, as above described in connection with FIGURE 2. In order, however, to bring the leads out of the tank, it is necessary to continue to retain the seal between the tank and external atmosphere for oil, gas and exterior moisture. I have found a novel method for bringing these leads out of the tank through opening 206 shown in FIGURE 4 in the upper dome 68, while still sealing opening 206 against the external atmosphere. This seal is best shown in FIGURE 11 which fragmentarily shows opening 206 in the wall of upper dome 68 in cross-section, and also shows leads 208 and 210 which are to be taken out through opening 206. If desired, the current transformer secondaries may be connected internally of the tank and the two common leads 208 and 210 then taken out; or, if desired, insulated leads from each of the current transformers may be taken out so that information as to which phase delivered a fault signal could be obtained at a remote point.

In order to accomplish this, and still retain a gas tight seal, I provide a first exit tube 212 which is welded to opening 206 and has a bolt plate 214 connected to the outer end thereof. A second exit tube 216 is then provided with a second bolt plate 218 welded to one end thereof. The bolt plates 214 and 218 are so arranged as to provide opposing shoulders which receive insulating plates 220 and 222 respectively which have a rubber plate 224 or a plate of similar flexible material therein. Each of plates 220, 222 and 224 have relatively small centrally disposed openings therein for receiving leads 208 and 210.

The bolt plates 214 and 216 then have a plurality of interconnecting bolts, such as bolt 226, which operate to draw the plates toward one another when the bolts are tightened. Therefore, after the unit is assembled, as shown in FIGURE 11, and tightened, the rubber plate 224 will be compressed and forced to flow around leads 208 and 210 and against the junction of plates 214 and 218 to thereby completely seal opening 206.

*Current path*

Referring to FIGURES 4 and 5, it has been previously described that each of the interrupter structures or arc quenchers, such as arc quencher 138, cooperate with movable bayonet-type contacts, such as movable contact 148 of FIGURE 9. When the unit is adapted for three-phase operation, two interrupters are connected in series for each phase. For example in FIGURE 5, a first phase will include bushings 52 and 58. Interrupters 130 and 134 of bushings 52 and 58 respectively are connected in series by virtue of conductive cross bars 228 and 230 which electrically connect movable contact 148 which cooperates with interrupter 130 to movable contact 232 (FIGURE 5) which cooperates with interrupter 134.

The second phase includes the series connection of interrupter 132 associated with bushing 54 and interrupter 136 associated with bushing 56 by virtue of cross bars 234 and 236 which electrically connect the movable bayonet-type contacts of the interrupters associated with bushings 54 and 56.

Finally, the last phase is completed by the series connection of the movable contact associated with interrupter 138 associated with bushing 62 and the interrupter associated with bushing 60 by virtue of cross bars 238 and 240 which electrically connect the movable contacts associated with these interrupters. The cross bars 228–230, 234–236, and 238–240 are constructed in the standard manner of previous single cross bars used in a single tank, but are supported in a novel manner to be described hereinafter.

From the foregoing, it will be clear that the electrical path through any one phase, such as the phase including bushing 52, will be from the external connector of bushing 52, the internal bushing conductor, bushing stud 160, ball 154, contact support 140, the tulip-type cluster of stationary contacts such as contact 142 of FIGURE 9, the movable bayonet contact 148, cross bars 228 and 230, the movable bayonet contact 232 of interrupter 134, the stationary tulip-type cluster of stationary contacts of interrupter 134 and thence out through the central bushing conductor of bushing 58 to the external connector for bushing 58.

The cross bars previously discussed and shown in FIGURE 4 for each phase are carried by insulating lift rods which may be of wood. Thus, cross bars 228 and 230 are clamped in any desired manner to vertical lift rod 242.

In a like manner, cross bars 234 and 236 are connected to a wooden lift rod 244, while cross bars 238 and 240 are connected to wooden lift rod 246. The lift rods 242, 244 and 246 are vertically movable so as to move their respective cross bars and the movable contacts connected to the cross bars downwardly toward a disengaged position with respect to the stationary tulip cluster contacts of the interrupting structures and upwardly to the engaged position shown in the figures. Note that in FIGURE 5 the disengaged position of the cross bars is shown in dot-dash lines.

The manner in which the cross bars 242, 244 and 246 are connected to the operating mechanism will be described more fully hereinafter.

Figure 15:
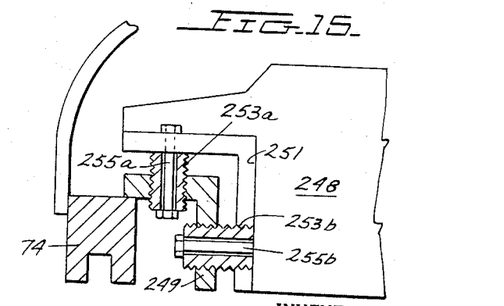
FIGURE 15 shows an enlarged section view of the manner in which the lift frame is adjustably secured to the upper dome section.

Since the lift rods are relatively long, a guide means for guiding their motion is provided by insulating guide board assemblies of an identical nature. These guides are securely bolted to the lift mechanism frame 248 of FIGURE 4 which includes angles 248a and 248b of FIGURE 5. The lift frame 248 permits the lifting of the complete circuit interrupter by lifting the upper dome 68 with respect to lower dome 66, and includes wooden support members 250, 252 and 254 for cross bars 242, 244 and 246, respectively. The lift frame can be adjusted both vertically and horizontally with respect to the ring 74 by securing an angle 249 (FIGURE 4) to ring 74 and securing a flange 251 of frame 248 as shown in FIGURE 15 to angle 249 by hollow bolts 253a and 253b which thread through tapped openings in angle 249. The bolts 253a and 253b are then adjusted until frame 248 is appropriately positioned, and securing bolts 255a and 255b are then passed through bolts 253a and 253b and are secured. As is best seen in FIGURE 5, the support members, such as support member 254, are formed of two parallel elements 254a and 254b. Each of the members 250 through 254 is terminated with protruding guide members, best seen in FIGURES 4 and 5 for the case of lift rod 246 as guide members 256 and 258 carried by elements 254a and 254b, respectively. A similar pair of guide members is provided for lift rods 242 and 244, one of which is seen for each of these lift rods as guide members 260 and 262, respectively.

A pair of rollers are then carried by the adjacently positioned guide members, such as rollers 264 and 266 of guide members 256 and 258 which straddle the lift rod 246, while similar rollers are provided for the guide members of lift rods 242 and 244. Accordingly, as the lift rods which are connected to the operating linkage at their upper ends are vertically moved, they will be guided by virtue of the straddling rollers described above, and will retain proper alignment and rigidity.

*Operating linkage*

Figure 12:
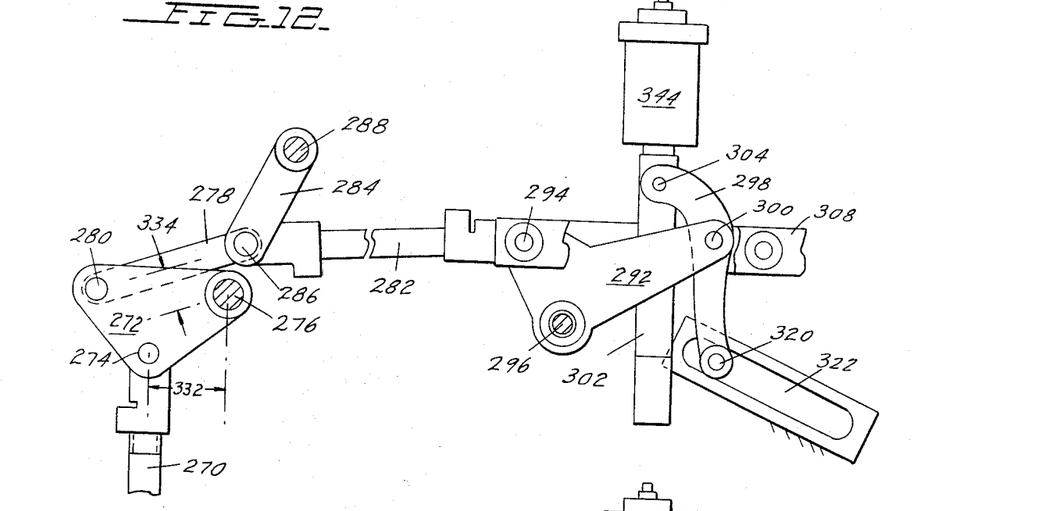
FIGURE 12 shows an enlarged plan view of the operating linkage of FIGURE 4 when the linkage is in the closed circuit position.
Figure 13:
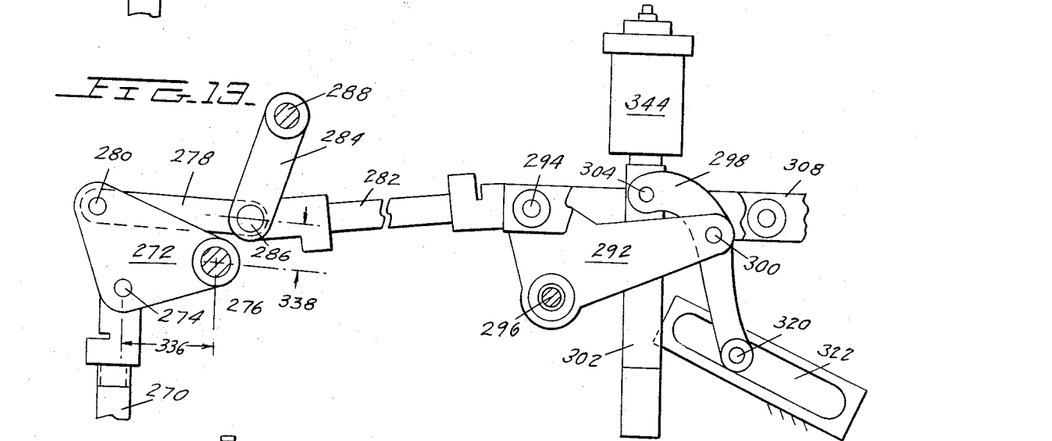
FIGURE 13 is similar to FIGURE 12 and shows the linkage position immediately prior to contact closure.

The operating linkage for transmitted force from operating mechanism 48 to the lift rods 242, 244 and 246 is best seen in FIGURES 4, 12 and 13, where FIGURE 4 shows the operating linkage for each of the phases, while FIGURE 12 shows the operating linkage as extending only to lift rod 246 with the contacts in the closed position, while FIGURE 13 shows the linkage for lift rod 246 for the position of the contacts when they are just about to touch.

The operating mechanism 48 has an output link 270 which is operated in any desired manner by operating mechanism 48, such as by manual crank operating means or by automatic means which are responsive to signals derived from the current transformers, such as current transformer 180 or by other electrical signals. Mechanism 48 may be of any standard type, and it is only necessary for purposes of the present invention to understand that it operates the output link 270 upwardly to open the circuit breaker and downwardly to close the circuit breaker.

The upper end of link 270 is pivotally connected to crank 272 at pin 274. Crank 272 is pivotally mounted at relatively stationary pivot 276, and has an output link 278 pivotally mounted thereto at pin 280.

The right-hand end of link 278 is pivotally connected to connecting rod 282 and guide link 284 at pin 286, the guide link 284 being pivotally mounted to stationary pivot 288 in serving merely to guide the motion of pin 286. The right-hand end of connecting rod 282 passes through a seal 290 which will be described more fully hereinafter, and serves to isolate interior of tank 20 from the interior of operating mechanism 48, and is pivotally connected to bell crank 292 by pin 294. Bell crank 292 is pivotally mounted to stationary pivot 296, and has its right-hand end pivotally connected to rocker arm 298 by pin 300. The upper end of rocker arm 298 is pivotally connected to link 302 at pin 304, and the lower end of link 302 is pivotally connected to lift rod 246 by pin 306.

Pin 300 also pivotally connects bell crank 292 and rocker arm 298 to link 308 which has its right-hand end connected to a plunger 310 which extends through compression spring 312 and terminates on pressure plate 314 of spring 312. When plunger 310 is moved to the left, it compresses spring 312 against spring seat 316, which is fastened to, or may be an integral part of, the spring container 318. The spring container 318 is elongated, as shown, to permit full expansion of spring 312 when plunger 310 moves to the right.

The lower end of rocker arm 298 is terminated with a roller 320 which moves in a guide slot 322 which is cut in the frame 248 whereby the motion of pin 304 is fixed by virtue of the fixed pivot 296 for bell crank 292 and the guided motion of roller 320 of rocker arm 298.

The lift rods 242 and 244 for the other phases of the circuit breaker are connected to rocker arms 324 and 326 in a manner identical to that described for rocker arm 298. Similarly, rocker arms 324 and 326 are pivotally connected to link 306, and have rollers at the bottoms thereof which are guided in slots 328 and 330, respectively. Therefore, the motion of lift rods 242, 244 and 246 will be identical because of the common connecting rod 308 which drives all of these elements in an identical manner.

In operation, the spring 312 operates to bias the contacts to an open position. Thus, the spring will move the lift rods 242, 244 and 246 downwardly, and to a disengaged position when operating link 270 of operating mechanism 48 is released by a latch mechanism within the operating mechanism (not shown) so that link 270 can move upwardly.

Assuming that the circuit breaker is in the disengaged position, in order to close the circuit breaker, link 270 is moved downwardly to thereby rotate bell crank 272 about pivot 276 and thus move link 278 to the left. This will cause link 282 to move to the left and rotate bell crank 292 in a counterclockwise direction about pivot 296.

The rotation of bellcrank 292 will operate to move rod 308 to the left, and thus compress spring 312. At the same time rocker arms 298, 324 and 326 move upwardly, it being noted that in the disengaged position rocker arms 298, 324 and 326 have their lower ends in the right-hand end of slots 322, 328 and 330 respectively. Because of this upward motion, the upper ends of rocker arms, such as pin 304 of rocker arms 298, is drawn upwardly so that the lift rods, such as lift rod 246, will be moved upwardly and toward the engaged position.

The motion of pin 304 and the upper pins of rocker arms 324 and 326 will be a vertical straight line motion in view of the relationship between fixed pivot 296 and slot 322. Accordingly, the mechanism operates to convert the horizontal motion of connecting rod 282 to a vertical motion for the lift rods, such as lift rod 246.

When the contacts reach their fully engaged position, a latch means within the operating mechanism (not shown) engages and holds the mechanism in position against the opening force of spring 312. When, upon demand, the operating mechanism is released or tripped, spring 312 is no longer restrained, and it rapidly rotates bell crank 292 in a clockwise direction about its pivot 296 to cause rocker arms 298, 324 and 326 to move rapidly downward in a straight line motion, as previously described, until the fully disengaged position is achieved.

As has been described, the operating linkage previously used in the art is such that an ever increasing mechanical advantage is applied to the linkage during the closing stroke to assist the operating mechanism in closing the the breaker at the end of the closing stroke. I have recognized that the greatest need for mechanical advantage in the operating linkage is immediately prior to the time that the circuit breaker contacts touch during closing, at which time a pre-arc occurs and creates forces tending to open the circuit breaker.

In the prior art linkages, where the mechanical advantage is ever increasing, it will be apparent that the maximum mechanical advantage is not yet reached at this point, and is reached only when the linkage assumes the fully closed position. I have further recognized that when the contacts are in the fully closed position, the load on the operating mechanism should be high to insure proper tripping by causing the mechanical advantage in the operating linkage at that time to be relatively low.

In the linkage shown in FIGURE 4 and reproduced in FIGURES 12 and 13, it will be seen that I have overcome the above two disadvantages, and provide a mechanical advantage immediately prior to closing, which is extremely high in the linkage (FIGURE 13), while the mechanical advantage under the fully closed condition of FIGURE 12 is relatively low. That is to say, when the circuit breaker is in the closed position of FIGURE 12, the effective lever arms 332 and 334 yield a relatively low mechanical advantage for transmitting force between link 270 and connecting rod 282. When, however, the linkage is moved to the position immediately prior to contact touch, the effective lever arm 336 (corresponding to previously effective lever arm 332) is greater than effective lever arm 332, while the effective lever arm 338 which corresponds to previous lever arm 334 remains relatively constant. Accordingly, the mechanical advantage immediately preceding contact touch is relatively high, while the mechanical advantage in the completely closed condition is relatively low by virtue of the interconnection and relative positions of bell crank 272 and link 278 which drives connecting rod 282.

A second spring is provided over each of the lift rod connecting links, such as link 302 for lift rod 246, such as compression spring 340, for the purpose of limiting over-travel of the lift rods at the end of the closing stroke. More specifically, and as best shown in FIGURE 14, spring 340 bears on a plunger 342 of FIGURE 4 which is movable within a spring containing cylinder 344 and engages the top of link 302. The motion of plunger 342 is limited by virtue of its containing cylinder 344, so that after a relatively short travel of plunger 342, when push rod 246 is moved downwardly, the lower end of plunger 342 will leave rod 302. Accordingly, the spring 340 serves to deliver an extremely high force for a short period of time during the initial operation of the lift rods to a disengaged position, and at a point where rapid acceleration is extremely desirable. If desired, the spring force may be adjusted by virtue of an adjusting nut 346 which adjusts the compression of the spring 340 in its fully extended position.

The unit is sealed from outside moisture by means of any desired type of cap which is bolted to cylinder 344 and the O-rings 350 and 352. As shown in FIGURE 14, the plunger 342 and cap 348 have aligned central openings 353 and 355. An analyzer rod 357 may, as shown in FIGURE 14, pass through openings 353 and 355 and be connected to the upper portion of link 302 whereby the analyzer rod will move with lift rod 246. Accordingly, the analyzer rod may serve to graphically record the exact motion of the movable contacts, whereby information may be obtained as to the rate of contact opening, rate of contact closing, contact bounce, etc.

Seal between tank and operating mechanism

As previously described, it is necessary to seal the passage which communicates between tank 20 and operating mechanism 48 and permits passage of connecting rod 282 between these elements. The problem is aggravated, since connecting rod 282 not only has a horizontal motion, but also has a slight lateral and angular motion, so that a typical slide gasket cannot be used.

I have found a novel method of sealing these elements, even though a member having horizontal, angular and lateral motion must pass through the seal. The seal structure 290 of FIGURE 4 which achieves this end, is best seen in the enlarged cross-sectional view of FIGURE 7.

Referring now to FIGURE 7, a plate 354 (see FIGURE 4) is secured in the passage between tank 20 and operating mechanism 48, and has an enlarged opening 356 therein for receiving connecting rod 282. A second plate 358 is bolted to plate 354, as shown, through an interposed annular spacing ring 360. Plate 358 has an opening 362 therein similar to opening 356 for passing connecting rod 282.

A plurality of thin sheets 364 are then secured about rod 282 with a very close clearance between the internal diameter of the opening in sheets 364 and the external diameter of rod 282. These seals are then contained between plates 354 and 358, and have an outer diameter, such that for the greatest lateral motion of connecting rod 282, the sheets 364 will still be contained between these plates. Accordingly, the rod 282 may move horizontally with respect to plates 356 and 358, since there is some clearance, and plates 356 and 358 are free to move up and down in a vertical plane as the rod moves laterally.

When there is lateral motion of rod 278, the thin sheets will move within the confines of plates 354 and 358 so that the openings 356 and 362 are still substantially sealed. When there is an angular motion of rod 282, the angular motion will not tend to rotate the complete group of plates 364, since these plates may move with respect to one another whereby the stack of plates will cant instead of attempting to rotate with rod 282. To minimize this problem, it is preferable that the center of rotation of rod 282, as determined by the motion of pin 286 and pin 294 of FIGURE 4, be as close as possible to the center of the stack of sheets 364. Thus, the plates on either side of this point will move in opposite directions for a minimum distance to absorb the rocking motion of the connecting rod 282, and at the same time, maintain a highly effective seal to prevent gases generated by arc extinction from entering the mechanism housing 48.

Figure 16:
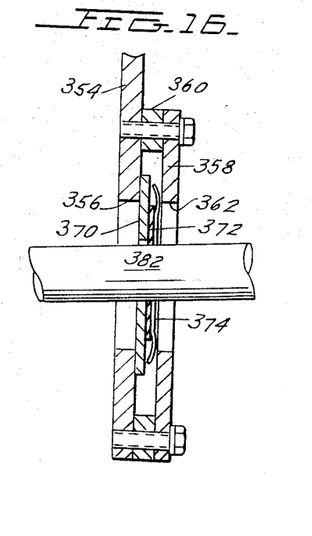
FIGURE 16 shows an alternative structure for the gas seal of FIGURE 7.

As an alternative to the seal of FIGURE 7, and instead of using a stack of thin plates, a sealing plate 370 may be positioned adjacent plate or sheet 354 and receive rod 282 through an enlarged clearance hole. A flexible disk 372 which may be of neoprene closely fits around rod 282 and is placed adjacent plate 370 and is backed up by a spring washer 374. The spring washer 374 will operate to hold the neoprene disk 372 in position even under low pressure conditions within the tank.

Unitary tank liner and interphase barrier

Figure 17:
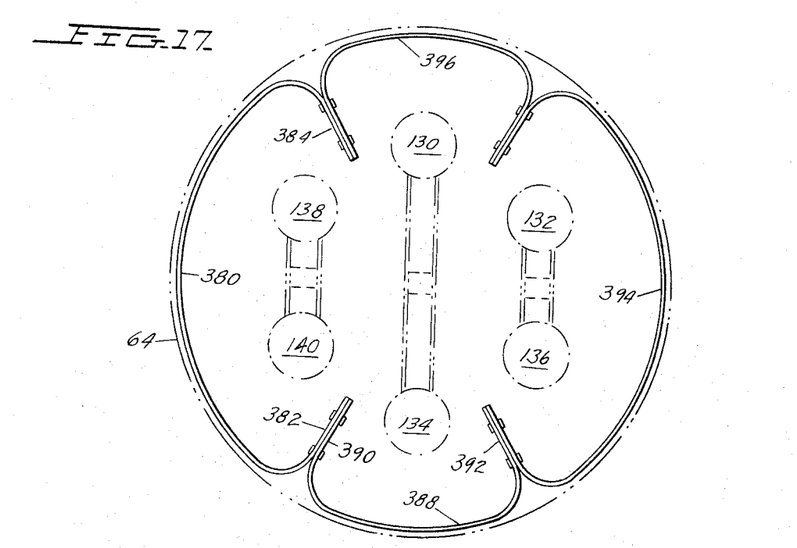
FIGURE 17 shows a top view of the tank interior and particularly illustrates my novel barrier for serving as a tank liner and as a barrier between phases.
Figure 18:
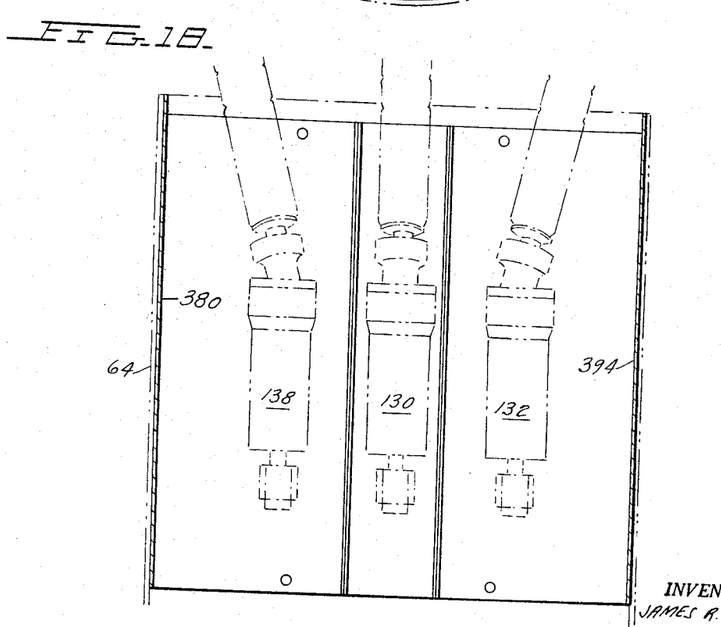
FIGURE 18 is a side cross-sectional view of FIGURE 17.

The novel unitary tank liner and interphase barrier for the tank wall is shown in FIGURES 17 and 18 where only the barrier is shown with the tank wall 64 and the interrupter assemblies such as interrupters 130 through 138 shown in phantom view.

As was shown for the case of FIGURE 5, the usual practice is to apply a circular tank liner such as tank liner 88 of FIGURE 5 to the interior of the oil tank whereby an expanding gas bubble from any of the interrupters during interrupting conditions will not be able to communicate from the interrupter to the tank wall to establish a line to ground fault. In addition to this, in many high voltage applications, additional barriers are positioned between interrupters of different phases to prevent the possibility of a gas bubble communicating between adjacent interrupters to establish a line to line fault during interruption.

In accordance with the present invention, both a tank liner and interphase barrier are provided through a novel unitary structure. Thus, in FIGURES 17 and 18, a first liner portion 380 of any insulating material such as pressboard covers roughly one-third of the circumferential area of the tank. The ends of insulating sheet 380 are then turned inwardly as ends 382 and 384 are turned inwardly to form a chamber or pocket around interrupter 138 and its series connected interrupter 140.

In a similar manner, a second insulating strip 388 of a material such as pressboard has inwardly extending ends 390 and 392 where strip 388 forms a chamber or pocket around interrupter 134. The ends 382 and 390 of strips 380 and 388, respectively, are secured along their length in any desired manner as through the use of insulating bolts, tying or gluing, to mention three possibilities.

A still further insulating strip 394 then forms a chamber for insulators 132 and 136 in the same manner as disclosed for insulator 380, and the chain of insulating strips is completed by strip 396 which forms a chamber for interrupter 130.

In view of the configuration presented, it is seen that each adjacent interrupter of a different phase, such as interrupters 130 and 138, is isolated from the others by an extending barrier formed by the ends of the insulating members serving as the tank liner.

Accordingly, through the use of a unitary insulating means formed of strips 380, 388, 394 and 396, the tank wall is completely lined, and the desired insulating barriers are provided whereby communication of gas bubbles from an interrupter to the tank wall or to an adjacent interrupter is prevented.

*Securing the cross bars to the lift rod*

Figure 19:
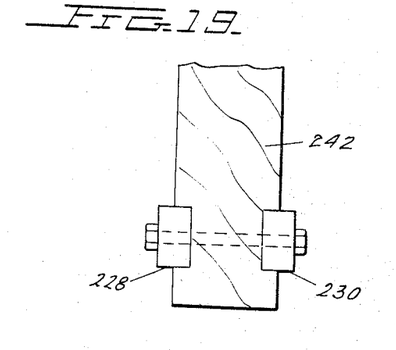
FIGURE 19 shows the usual manner of fastening the cross bars to a wooden lift rod.
Figure 20:
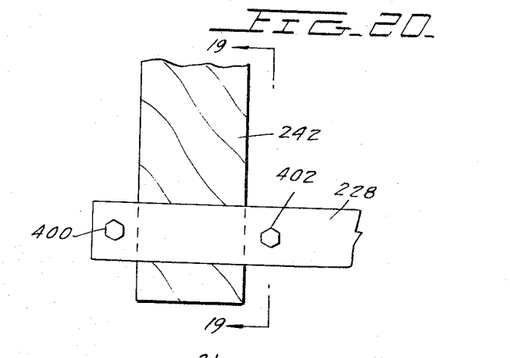
FIGURE 20 is a side view of FIGURE 19.

In the past, a wooden lift rod such as wooden lift rod 242 of FIGURES 4, 19 and 20 has been secured to its cross bars 228 and 230 by first forming an accurate notch in the sides of lift rod 242 as shown in FIGURE 19 and then inserting cross bars 228 and 230 in this notch. A first and second bolt, such as bolts 400 and 402, rigidly attach cross bars 228 and 230 to the lift rod 242 as best shown in FIGURES 19 and 20. Note that FIGURE 19 is a cross-sectional view of FIGURE 20 taken across the lines 19—19 of FIGURE 20.

This method of securing is subject to two disadvantages. The first is that the notch in the wooden lift rod must be very accurately cut, and secondly, it decreases the strength of the wooden lift rod since it decreases its cross-sectional area for a relatively long axial length.

Figures 21, 22, 23, 24, 25:
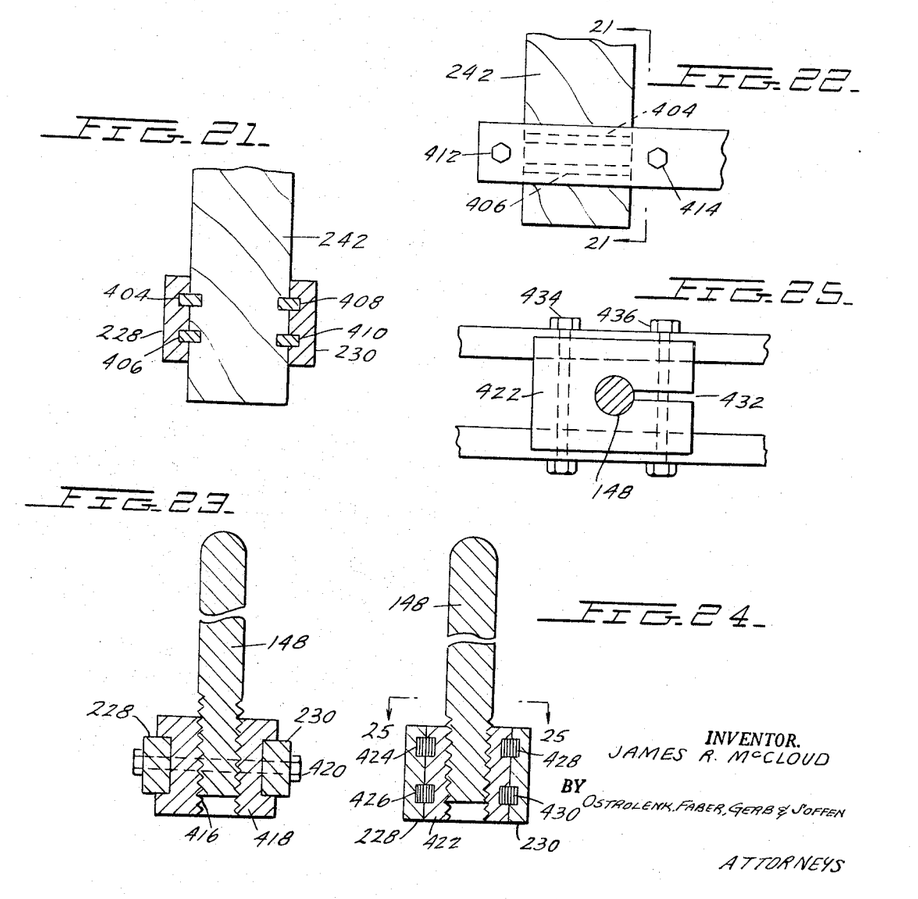
FIGURE 21 illustrates the manner in which the fastening structure of FIGURES 19 and 20 is modified in accordance with the invention.
FIGURE 22 is a side view of FIGURE 21.
FIGURE 23 is a cross-sectional view which illustrates the presently used manner in which the movable bayonet type contact is secured to the cross bars.
FIGURE 24 is a side cross-sectional view similar to FIGURE 23 which illustrates the modification in securing the movable contact to the cross bars in accordance with the present invention.
FIGURE 25 is a top view of FIGURE 24.

A further feature of the present invention is to modify the method of securing the lift rod and cross bars in the manner shown in FIGURES 21 and 22.

Thus, in FIGURES 21 and 22, the cross bars 228 and 230 are positioned with respect to lift rod 242 by keys 404, 406, 408 and 410. As best seen in FIGURE 22, which is a cross-sectional view of FIGURE 21 is derived across lines 21—21 of FIGURE 22, the keys such as keys 404 and 406 run across the width of lift rod 242. By using these key members, it is only necessary to form keyways in the cross bars 228 and 230 and cooperating keyways in lift rod 242 whereby a greater gripping strength is provided between the cross bars and lift rod, and a machining operation can be done with less accuracy.

The securing of the cross bars 228 and 230 is similar to that of FIGURES 19 and 20 whereby bolts 412 and 414 are placed on either side of lift rod 242 as shown in FIGURE 22.

*Securing the movable contact to the cross bars*

In the past, the movable contact is connected to a conductive block which is in turn connected to the cross bars. Thus, as shown in FIGURE 23 for the case of movable contact 148 and cross bars 228 and 230, the movable contact is threadably secured to a threaded opening 418 in conductive block 418 which may be made of aluminum. A notch is cut on either side of block 418 to receive the cross bars 228 and 230 in much the same manner as the wooden lift rod receives these cross bar members in FIGURE 19. Here again, an accurate machining operation and substantial decrease in strength of the block is required.

Securing blocks such as bolt 420 are then placed on either side of the movable contact to rigidly clamp members 228, 230, 418 and 148 together. Here again I have found that a novel keyway construction can be used to simplify the securing of the cross bars to the block.

Thus, as is shown in FIGURE 24, movable contact 148 is threadably secured to aluminum contact block 244, and the cross bars 228 and 230 have keyways therein which cooperate with keyways in block 422 to receive keys 424, 426, 428 and 430.

As is best seen in FIGURE 25, which is a cross-sectional view of FIGURE 24 taken across lines 25—25 of FIGURE 24, the block 422 has a slot 432 therein so that upon the tightening of bolts 434 and 436, the slot 432 is drawn inwardly to rigidly secure the threaded connection between block 422 and contact 128.

Figure 26:
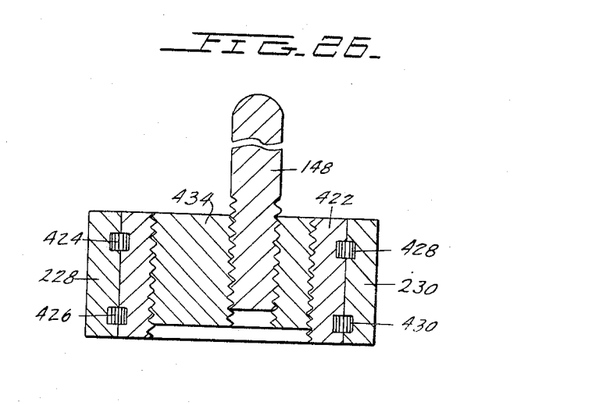
FIGURE 26 is a side cross-sectional view of a modification of the embodiment of FIGURE 24 whereby the movable contact is laterally adjustable.
Figure 27:
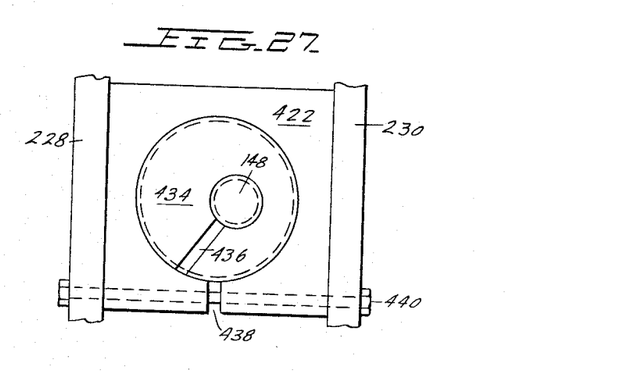
FIGURE 27 is a top view of FIGURE 26.

An alternative method of connecting the movable bayonet type contact 148 to cross bars 228 and 230 is shown in FIGURES 26 and 27 which still provides the key construction using keys 424, 426, 428 and 430 of FIGURE 24 to connect the cross bars to block 422. In the case of FIGURE 26, however, block 422 has a threaded insert member 434 of conductive material which receives bayonet contact 148 in an off-center threaded opening.

Accordingly, by rotating ring or insert 434, the movable bayonet contact 148 will be displaced in a lateral plane with respect to cross bars 228 and 230 and achieve adjustment of the position of the bayonet contact 148.

As is seen in FIGURE 26, which is a top view of FIGURE 27, ring 434 has a slot 436 therein, while block 422 has a slot 438 therein. Accordingly, as the clamping bolt 440 is tightened, both slots 430 and 438 will be compressed to cause a firm connection between block 422 and ring 434 and then ring 434 and contact 148.

*Round Fiberglas lift rod and guide means therefor*

As previously described in FIGURE 4, the square wooden lift rods 242, 244 and 246 require a relatively complex guiding structure.

I have found that a tubular plastic tube which could be made of Fiberglas can be used for the body of the lift rod. Some of the problems which exist in the use of the round plastic tube which could be of Fiberglas are in the guiding of the relatively long tube and in the manner of connecting the tube to the steel connecting links such as link 302 of FIGURE 4 which is connected to the output of the operating linkage at one end and to the wooden lift rod at the other end.

Figure 28:
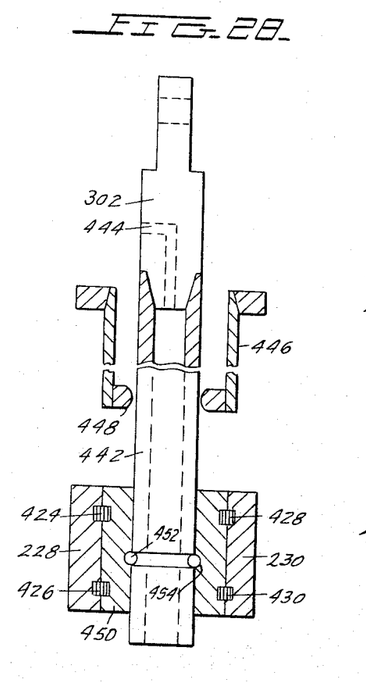
FIGURE 28 is a side partially cross-section view of a Fiberglas lift rod and illustrates the manner in which the lift rod is secured to the cross bars and to the upper operating linkage, as well as the manner in which the lift rod is guided.

In FIGURE 28, I have shown one manner in which a Fiberglas tube 442 can be used for the body of the lift rod. In order to secure this Fiberglas rod to steel member 302, I have found that by providing a 2° taper in the inner tube opening of tube 442 and a cooperating 2° taper on the end of rod 302 and by using a glue joint between these two tapers which could be of an epoxy resin that an extremely rigid connection can be formed. The 2° taper is essential, and it has been found that a relatively large variation from this 2° taper defeats the strength of the joint.

In addition, it may be desirable, since the rod 442 is hollow, to provide an air hole 444 in the metal link 302.

In order to guide this long round rod, I provide a guide tube 446 which may be of steel and is concentric with rod 442. The upper portion of steel tube 446 is then secured to the frame 248 of FIGURE 4, and the lower end of the tube is provided with an annular guide insert 448 which may be of Bakelite. Where the rod 442 has a diameter of roughly 1½", I have found that the clearance between the rod and the inner diameter of insert 448 should be 1/32" to achieve the required degree of guidance.

The lower end of the tube 442 which is to be secured to cross bars 228 and 230 through the intermediary of a block 450 which may be of aluminum is achieved through the use of a split wire ring 452 which may be of brass. More specifically, split wire ring 452 is first contained within a notch in the lower end of rod 442 which has sufficient depth to allow the wire to fall flush with the outer diameter of rod 442. The inner annular notch 454 is then provided in block 450 which permits ring 452 to expand when annular notch 454 is rigid, whereby rod 442 is rigidly secured to block 450. The block 450 is then connected to cross bars 228 and 230 by keys such as keys 424, 426, 428 and 430 shown in FIGURE 24.

Although I have described preferred embodiments of my novel invention, many variations and modifications will now be obvious to those skilled in the art, and I prefer therefore to be limited not by the specific disclosure herein but only by the appended claim.

The embodiments of the invention in which an exclusive privilege or property is claimed are defined as follows:

In an oil tank for a three phase oil blast circuit breaker; a first, second, and third interrupter assembly connected to a respective phase of a three phase line being positioned in spaced relation within said oil tank; a tank liner combined with interphase barriers; said tank liner and interphase barriers being comprised of a plurality of sheets of insulating material; said sheets of insulating material defining a respective chamber for each of said first second and third interrupter assemblies; said tank having an interior surface; each of said sheets integrally including a portion of said tank liner and extending portions extending from the interior surface of said tank to an area interposed between said interrupter assemblies; each of said sheets being adjacent and between two others of said sheets and each of said sheets defining one of said chambers with adjacent ones of said extending portions of adjacent sheets defining said barriers.

References Cited
UNITED STATES PATENTS

| | | | |
|---|---|---|---|
| 1,634,444 | 9/1927 | Burnham | 200—150 |
| 2,028,963 | 1/1936 | Wood | 200—150 |
| 2,283,874 | 5/1942 | Nye | 200—150 |
| 3,157,769 | 11/1964 | McCloud | 200—150 |

ROBERT S. MACON, *Primary Examiner.*